United States Patent [19]

Wilson

[11] Patent Number: 4,977,612

[45] Date of Patent: Dec. 11, 1990

[54] CHANNEL SELECTION IN A MULTI-FREQUENCY RADIO DATA COMMUNICATION SYSTEM

[75] Inventor: Timothy J. Wilson, Schaumburg, Ill.

[73] Assignee: Motorola, Inc., Schaumburg, Ill.

[21] Appl. No.: 419,369

[22] Filed: Oct. 10, 1989

[51] Int. Cl.$^5$ .......................... H04Q 7/00; H04B 17/00
[52] U.S. Cl. ...................................... 455/166; 455/34; 455/54; 455/67; 340/825.04
[58] Field of Search .................. 455/33, 34, 54, 56, 455/67, 179, 166, 161, 186; 340/825.5, 825.04, 825.51; 379/59, 60, 63; 371/32, 33

[56] References Cited

U.S. PATENT DOCUMENTS

| | | | |
|---|---|---|---|
| 4,716,407 | 12/1987 | Borras et al. | 455/166 |
| 4,759,051 | 7/1988 | Han | 379/59 |
| 4,815,073 | 3/1989 | Gravel et al. | 455/33 |
| 4,905,301 | 2/1990 | Kralopp et al. | 455/166 |
| 4,921,464 | 5/1990 | Ito et al. | 455/34 |

Primary Examiner—Reinhard J. Eisenzopf
Assistant Examiner—Curtis Kuntz
Attorney, Agent, or Firm—Donald B. Southard

[57] ABSTRACT

A method and apparatus are disclosed for improved channel selection in a multi-frequency radio data communications system whereby a minimum level of signal/service quality may be maintained at all times without unduly impacting channel loading considerations. Specialized idle messages are utilized in the outbound channel of the radio system which are required in any event but include added information for the monitoring remote terminals to determine channel quality and take appropriate action by selecting a new channel to operate on if channel quality falls below a preset threshold level.

20 Claims, 4 Drawing Sheets

CHANNEL SELECTION IN A MULTI-FREQUENCY RADIO DATA COMMUNICATION SYSTEM

BACKGROUND OF THE INVENTION

The present invention relates in general to communication systems and, in particular, to a multi-frequency radio data communication system wherein channel selection is effected at all times with a view towards maintaining a given threshold level of service quality and balanced loading.

A typical radio data communication system may comprise a centrally located Network Control Processor (NCP) connected by wire line, usually a leased line, to a plurality of remote RF transmitting stations defining the coverage for a given area. The NCP is also connected to, and is controlled by, a host computer. The individual RF stations may include a local General Communication Controller (GCC) and an associated transmitter/receiver. The individual RF stations are all interconnected to the central NCP to thus form the particular data network which communicates with a plurality of portable/mobile (remote) data terminals transportable throughout the coverage area.

As may be appreciated, there are certain significant differences in such radio data systems as compared to a more well-known conventional two-way radio voice communication system. Normally, such radio data systems require two separate channels, an inbound channel on which the portable/mobile terminals communicate with the central NCP, and an outbound channel on which the NCP communicates selectively with the individual portable/mobile terminals. Another distinguishing aspect is that the individual portable/mobile terminals must, when they are to make a transmission to the central NCP, contend with the other remote radio terminals in the system for access to the inbound channel.

The system portable/mobile terminals monitor the outbound channel in a manner determined by an operating protocol. In one known arrangement, the portable/mobile terminals monitor the outbound channel for an indication of any activity by others and, if sensed, do not transmit at that time, but retry later, usually on a random basis. To aid the portable/mobile terminals in determining the presence of channel activity on the inbound channel, the NCP includes a stream of bits, termed "busy bits," embedded in the messages constituting the outbound channel stream, whenever the NCP is in fact receiving a transmission on the inbound channel. This protocol regulates radio traffic and is conventionally termed a CSMA, or "Carrier Sense, Multiple Access," protocol. There are variations of this CSMA operating procedure to accommodate various operational needs of the radio data systems but need not be described in any further detail regarding the merits of the present invention.

The foregoing arrangement works entirely satisfactory for radio data communication systems operating on a single frequency. In multi-frequency systems, however, other factors come into play. In such multi-frequency systems, for example, it is for the portable/mobile terminal to determine, and insure effective operation on a particular channel, among a choice of channels, which will effect acceptable service. Accordingly, the terminal must be capable of monitoring the various channels in terms of signal/service quality and change channels if need be (when service quality falls below some set threshold level).

There are a number of variables that make this monitoring task somewhat complex and difficult. For example, the terminals can move in and out of the defined coverage area and therefore the service quality available to the terminal on any particular channel will probably change over time. Further, the received RF signal may well suffer from the well-understood multipath fading effects, so that a reasonable statistical sample may well be required in order to make an effective guess at signal level. Moreover, there may be more than one RF station serving a particular geographical area on the same channel. Received signals on some of these channels might well appear to be weak while others strong. Further, if the system includes multiple stations on the same channel which may be keyed by the central NCP controller, a condition may occur in which RF collisions are noted. Finally, it must be kept in mind that in selecting appropriate channels, it is desired that minimal channel capacity be dedicated to this function since the main purpose of the radio data communication system is to transmit users' data messages.

In any event, to monitor the channel for service quality, the portable/mobile terminals must have information to monitor, which necessarily must be provided by the centrally located NCP on the outbound channel. One known method employed in the past has been to utilize a Signal Quality Message (SQM) as part of the outbound channel stream. This message was devised to contain a predetermined bit pattern so that when received by the various remote terminals, the bit errors could be counted directly. However, such SQM's occupy a fair amount of the outbound capacity—on the order of about 18% (per station). It will well be appreciated that this technique does not appear conducive to multi-frequency systems with multiple co-channel stations. If there were only five such stations on a channel, as an example, the SQM technique would require five times 18%, or about 90%, or just about the entire outbound capacity of the channel. Obviously, this is less than desirable.

Accordingly, what is needed is an arrangement for use in a multi-frequency radio data communication system wherein the individual portable-mobile terminals may nevertheless continuously and effectively monitor and, in fact, determine the service quality of each of the available channels without unduly affecting (wasting) system capacity. Moreover, such terminals when faced with service quality falling below a set threshold level, should be capable of selecting a new channel to overcome such deficiency. Short term information should be obtainable to combine with longer term past data to obtain a good statistical estimate for the quality of the channel so selected.

SUMMARY OF THE INVENTION

Accordingly, it is an object of the present invention to provide an improved multi-frequency radio data communication system wherein portable/mobile radio data terminals may move about the geographically defined coverage area and selectively choose any operating channel at any given time which has been evaluated and determined to provide service quality above a set threshold level.

A more particular object of the present invention is to provide and improve multi-frequency radio data communication systems of the foregoing type wherein channel scan and quality determination may be effected from specialized idle messages included within the message stream on the outbound channel, which idle messages contain, inter alia, the identification of the particular RF station that sourced the message.

In practicing the invention, a multi-frequency radio data communication system is provided operating on inbound and outbound channels having a centrally located main controller interconnected to a plurality of remote transmitting sites, each site including a local controller, a transmitter and a receiver. These sites communicate with a plurality of portable/mobile terminals. Each terminal randomizes the list of frequencies available in the system and, upon turn-on, selects a channel from that list. If traffic is found, the terminal evaluates the service quality therein and, if within acceptable limits, sends a channel registration message. Upon receiving an acknowledgement in response thereto, it may begin operating on such channel. Further, the portable/mobile terminals continue to monitor the outbound channel and if service quality falls below a set threshold level, such terminal selects a new channel from the randomized list and attempts to register as it did upon turn-on. If it fails to successfully register for any reason, a new channel is selected from the list and the process continues until one is found and, in fact, registered on. It is to be noted that the portable/mobile terminals in response to a failure to successfully send an inbound message due to message errors, will simply treat the circumstance the same as receiving no acknowledgement response to a channel registration message, that is, an indication of less than acceptable signal/service quality, which will then precipitate a new channel selection in accordance with the referenced process.

BRIEF DESCRIPTION OF THE DRAWINGS

The features of the present invention which are believed to be novel are set forth with particularity in the appended claims. The invention itself, however, together with further objects and advantages thereof, may best be understood by reference to the accompanying drawings, in which:

FIG. 7 is a flow diagram of the background monitor channel process used by the system radio data terminals to evaluate the system quality aspect and to include the derived information in the CQT.

DESCRIPTION OF THE PREFERRED EMBODIMENT

Figure 1:
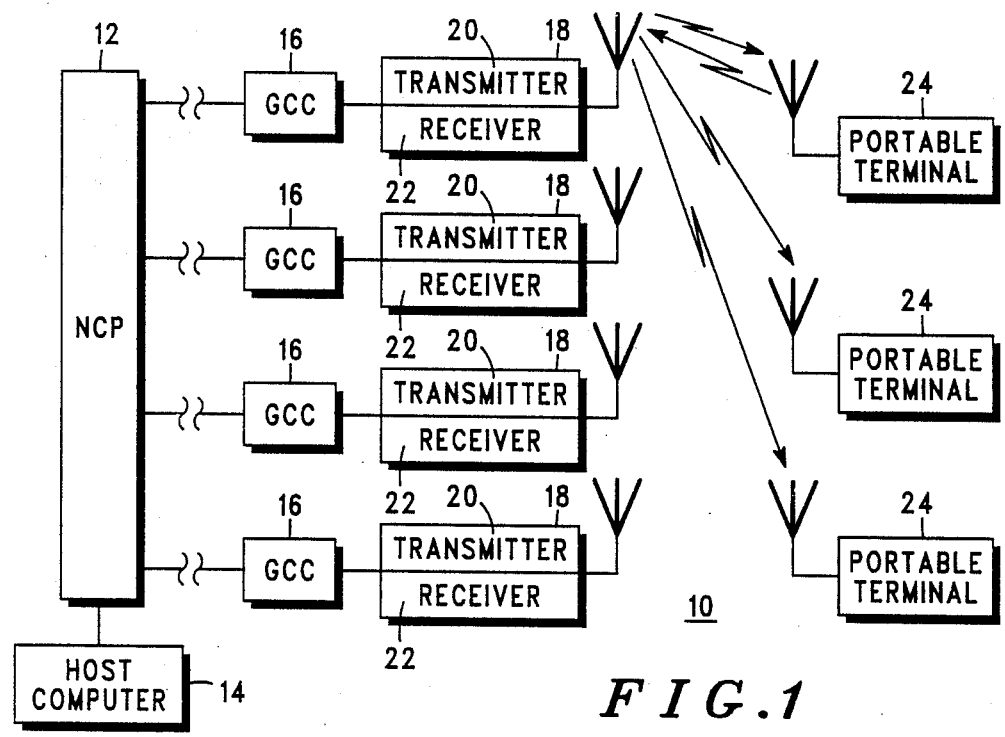
FIG. 1 is a blocked diagram of a radio data communication system that may advantageously utilize the present invention.

Referring now to the drawings, a radio data communications system 10 is shown in FIG. 1 which may advantageously utilize the present invention. The system as illustrated includes a centrally located Network Control Processor (NCP) 12 interconnected to, and controlled by, a Host Computer 14. The NCP 12 is selectively interconnected, say, for example by a leased line to a plurality of General Communication Controllers (GCC) 16. These GCC's in turn are connected to and control an associated RF transmitting site or station 18, each comprising a local transmitter 20 and a receiver 22. The GCC's and associated RF station equipment are selectively located within a given geographical area to define the boundaries of a particular radio data communications system, as will be better described in connection with FIG. 2 et seq. The RF stations 18, controlled by an associated GCC 16, and in turn by the NCP 12, communicate with a plurality of portable/mobile radio data terminals 24 moving within and about the defined geographical coverage area.

Although not indicated by the block diagram of FIG. 1, the radio data system 10 as shown therein is intended to operate on more than a single frequency, that is, it is a multi-frequency system. As such, the individual RF stations 18 may be capable of transmitting on a particular one of the available frequencies in the overall system 10. For transmitting on each available frequency requires a separate and individual GCC and associated transmitter/receiver. Accordingly, the system may be designed such that some sites may be capable of only one transmitting frequency while others may have multi-frequency capability.

Multi-Frequency System

As previously mentioned, the individual sites will have at least one RF station 18 capable of transmitting on a particular one of the available frequencies of the overall system 10. Where desired, operating on more than one frequency will require separate RF stations and associated controllers for each such frequency to provide this multi-frequency capability. Such is the case for multi-frequency here under consideration. However, it should be appreciated that the arrangement wherein frequencies are assigned to individual sites as required in the interest of system coverage, whether they be single frequency or multi-frequency, is to be considered the more general case, and may well be the more difficult in terms of system planning and operating efficiency. This is because all channels may or may not be available everywhere in the coverage area, and the centrally located NCP can't know which channels are available to a particular terminal.

Accordingly, the individual remote terminals themselves are responsible for scanning the available channels and finding one with acceptable data service. Moreover, assigning fixed "primary" or "home" channels to the remote portable/mobile data terminals is not feasible since in general the "home" channel may not be available at the location of the terminal. Further, there may be a large number of routing paths to a given terminal (N sites for M channels) and may simply be too many to permit a blind search by the NCP for outbound message delivery. Accordingly, the terminal must inform the NCP of its operating channel by some kind of inbound message arrangement. For example, it may use the Signal Strength Information (SSI) generated by such message to update its portable data base so it can send outbound messages to the proper zone.

Figure 2:
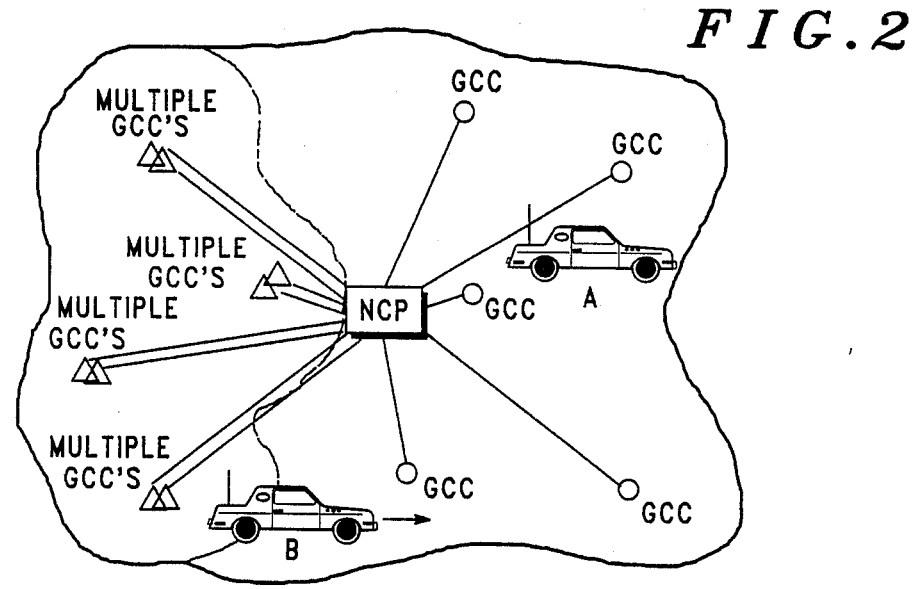
FIG. 2 is a graphic representation of such a system of FIG. 1 operating in a defined geographic area covered by multiple sites, some of which are capable of more than one operating frequency.

For purposes of example only, one such multi-frequency system 10 is shown graphically in FIG. 2. As therein illustrated, the NCP 12 is centrally located within the coverage area and is interconnected by leased lines to the various system GCC's and associated RF Stations strategically located throughout the coverage area. Those sites which have but a single operating frequency are indicated by the circle symbols, while those sites (multiple GCC's) capable of more than one operating frequency are indicated by the double triangle representation and are shown as connected to the NCP by parallel leased lines. As further indicated, the system contemplates a plurality of remote portable/mobile data terminals that may move about and within the system coverage area. In this regard, one such mobile station is shown positioned at location "A" and a further mobile station is shown leaving the area where multiple frequency coverage is available and is entering an area which may effect single frequency operation only.

An overview of the systems operation and procedure may well be in order to facilitate an understanding of the various aspects. Upon turn-on, an individual portable/mobile data terminal must in some fashion review (scan) the various channels or frequencies available for use and select a potential candidate. The terminal monitors such channel candidate and if carrier is detected, the terminal halts for a given time (say three or four seconds) and evaluates the service quality thereof. If within acceptable limits, the terminal attempts to register on the channel by sending a pre-designated message, expecting an acknowledgement thereto from the central NCP in due course. If the acknowledgement is forthcoming, the terminal is "registered" and proceeds to operate on the selected and evaluated channel.

If, on the other hand, the quality evaluation by the portable/mobile terminal falls below acceptable limits, or if an acknowledgement is not received back from the NCP, the terminal, after suitable retransmissions of the referenced registration message, reenters scanning operation, selecting another potential channel candidate and repeats the foregoing procedure.

Once registered, the portable/mobile terminal is programmed to nevertheless continue to monitor the outbound channel in order to determine if good service is still being effected on the channel on which it is operating. Information must be obtainable from the channel monitoring process by which the terminal may determine whether such quality level is being provided. Such analysis is at least effected on an ingoing basis and may be as well on an outgoing basis, if deemed desirable. That is, both the central station as well as the active portable/mobile terminal transmitting on the inbound channel may monitor for respective channel quality. Using this information, the terminal must be able to track the service quality available from each station it "hears" on the channel. As long as at least one such RF station provides acceptable service, the portable/mobile radio terminal will remain on the selected channel. However, if it determines that none of the stations can provide acceptable coverage, the portable/mobile data terminal again reenters the scan or channel selecting mode.

The centrally located NCP supports the remote data terminals scanning and monitoring operation by providing a required minimum number of suitable outbound message blocks from which the remote terminal may extract the required information. It also must identify each of the terminal's providing inbound messages when attempting to select an appropriate channel and register thereon by extracting the terminal's ID number as well as the ID number of local GCC communicating with the remote terminal and then communicating with the identified remote terminal. If the NCP is also charged with the responsibility of monitoring service quality for its end, it also first determines whether the signal being received is in fact adequate for service quality. If such is not the case, the NCP in this case does not send the expected acknowledgement back to the transmitting radio data terminal. If such quality level is determined to be acceptable and acknowledgement is duly sent, the identity of the transmitting remote portable/mobile terminal is entered into an appropriate memory location within the NCP to keep track of what remote terminal is operating with what remote RF station. For a more detailed description of this phase of system operation may be obtained by reference to U.S. Pat. No. 4,670,906, issuing to Stuart W. Thro, entitled "Transmitter Selection Method and Apparatus", and assigned to the same Assignee as the present invention.

As mentioned previously, there are actions that occur in a multi-frequency system that simply are not present in a less complicated frequency system. For example, the remote data terminals in a multi-frequency system creates by its own initiative inbound messages without further intervention by the terminal user. This new ability/requirement by the remote terminals in creating inbound messages may well lead to channel loading problems. When the RF System is first brought up, all the active remote terminals could try and send the pre-arranged (registration) messages to register at the same time. Further, they could disproportionately attempt to register on certain of the channels as compared to others. In either case, channel overloading could well result causing missed messages and excessive delays. Moreover, remote terminals in a poor coverage area could, without more, gain and lose coverage repeatedly, thereby causing it to generate an excessive number of registration message attempts which would unduly interfere with legitimate inbound data messages from other terminals.

These deficiencies that would otherwise obtain in other systems are effectively addressed in the system utilizing the present invention. First, the problem of excessive number of remote terminals attempting to disproportionately register on any given channel or channels is prevented in the present arrangement by requiring all such remote terminals to select channels when needed from a completely randomized frequency listing. Such randomized listing is different for each remote portable/mobile data terminal. Accordingly, when each of the remote terminals in the system enter the channel selection mode at whatever time, such terminals will select a frequency from their particular remote listing which will necessarily differ from such listings in other of the terminals so as to prevent simultaneous registration attempts.

Secondly, the problem of all active terminals attempting to register at the same time when the system RF is brought up is dealt with by splitting the scan operation into two modes, a short (normal) scan and a "long" scan. Remote terminal initially enters short scan in response to a channel monitor indication as previously described. However, if the terminal remains in short scan for greater than some given time, say, thirty or forty seconds, without finding an appropriate channel, it concludes that the RF system is probably down and enters the long scan operation. The difference between the two scanning modes is in the behavior of the terminal once a channel is located. In short scan, the terminal automatically registers or attempts to register immediately on the new channel. In the long scan, however, the registration is withheld until expiration of a second random timer, thereby preventing overload.

The last mentioned problem may be addressed effectively by keeping track of the number of registration messages noted by a particular remote terminal in a given period of time. When the rate of generation exceeds a certain threshold, the remote terminal then inhibits itself from further registration attempts for a set period of time.

With respect to the evaluation process the remote terminals engage in to evaluate service quality of any particular operating channel, it is to be noted that the terminal must have some information to monitor. That is, there must be some message or other relevant information derived therefrom that will indicate what the level of quality is. As mentioned previously, one approach in the past has been for the radio data system to use a dedicated Signal Quality Message (SQM) which includes a predetermined bit pattern so that the system remote terminals may count the bit errors directly. However, the SQM is necessarily substantial in length and occupies an unacceptable amount of the outbound capacity. In a multi-frequency system, with the SQM being sent from each station, the outbound capacity is quickly used up.

Such problem does not occur in the system of the present invention, however. Here the approach is to utilize the idle messages that must be employed in any event. However they include meaningful information that will enable the respective remote terminals to extract and determine service quality.

Idle messages are a normal, indeed, an essential part, of any radio data communication system. They are needed to guarantee good throughput on the inbound channel by insuring the outbound data stream is present or "on" for a high percentage of the time. Busy bits are only present in the outbound stream when an inbound message is occurring. Outbound channel activity is required for monitoring purposes even when there is no inbound message in progress. Hence, idle messages are inserted in the outbound channel stream for this purpose. These idle message are normally inserted during the hang-time period following each "real" data message from the NCP. They are of a short duration, say 20 msec or so. Conventionally, such idle messages will be null messages addressed to a nonexistent remote terminal.

Figure 3:
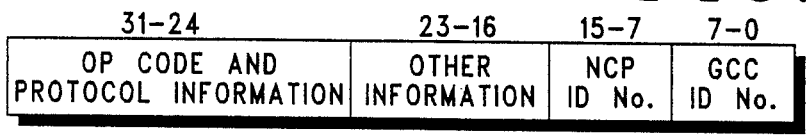
FIG. 3 is a graphic representation of an idle message that is advantageously used in the system of the present invention.

To avoid the use of capacity-consuming dedicated messages such as the aforementioned SQM's, the present invention takes advantage of the referenced idle messages, which are required in any event but add nothing to the capacity consumption of the radio data system. However, meaningful information is now included therein to permit an effective quality evaluation of the particular channel. The format of such idle messages utilized in the system of the present invention are shown in FIG. 3. As indicated, all such messages include the address of its RF source or more precisely, the ID number of the GCC communicating with the particular remote terminal. The ID number of the NCP is also included, if more than one such NCP is in the system. Other information is included but is deemed not relevant for purposes of the present invention. In any event, appropriate algorithims are included in each of the remote terminals which track the coverage available from each RF source in the channel using the message and information therein. Signal strength information obtained from each individual message is combined with past data to obtain good statistical estimates notwithstanding the short duration of such messages.

With the foregoing in mind, a more detailed description of the novel procedures which provide the advantages inherent in the system of the present invention that appears to be in order.

Channel Selection

Figure 4:
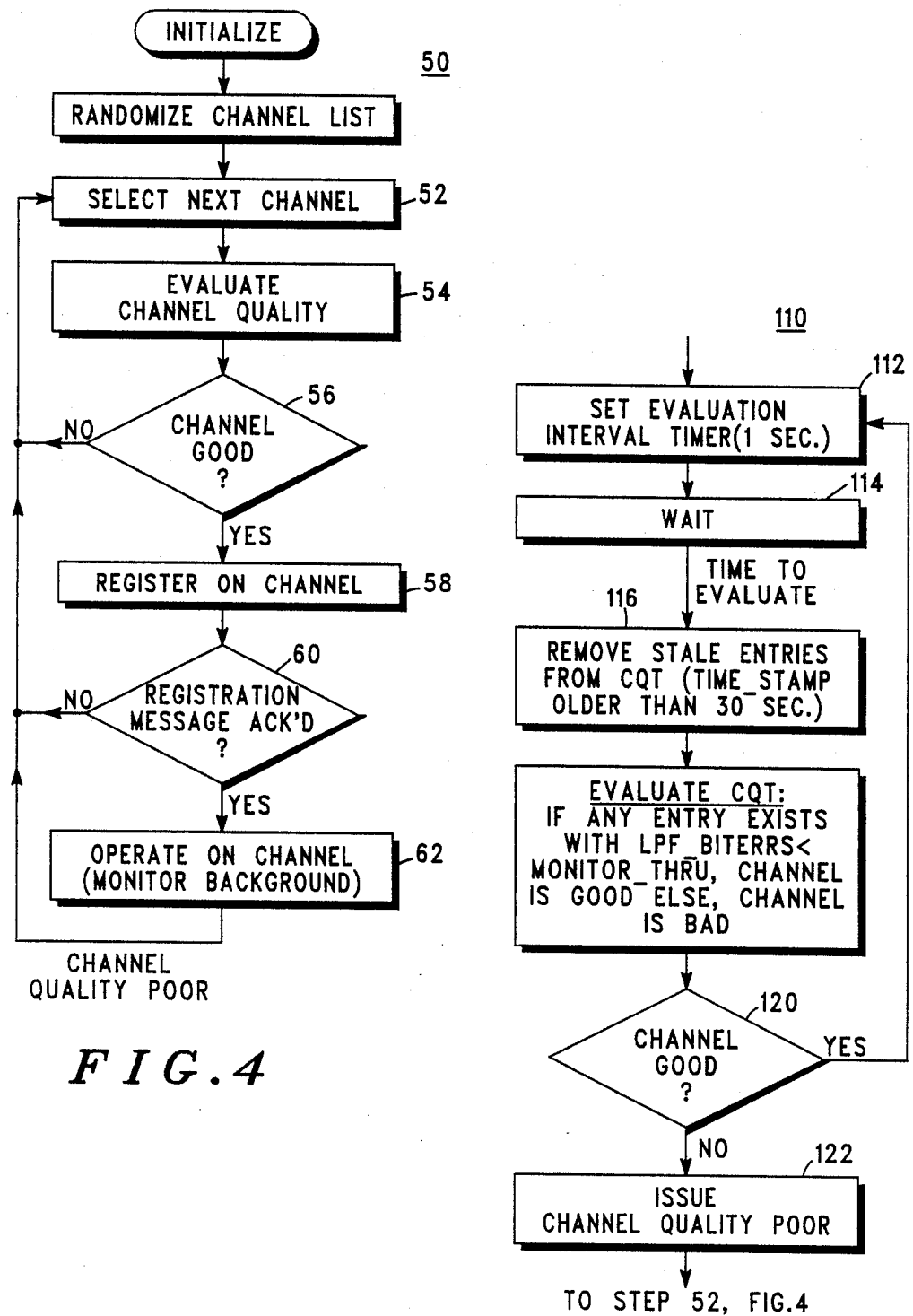
FIG. 4 is a flow diagram of the channel selection process the various system radio data terminals apply for selecting the channel at any given time.

As shown in FIG. 4, upon turn-on, or when the remote terminal 24 determines channel service quality falls below a set level (threshold), the terminal initializes and proceeds to select an available frequency or channel from its randomized listing, as indicated in step 52. Here the terminal 24 evaluates service quality at step 54 as will be described subsequently in connection with FIG. 5. If the quality is above the set threshold level, as indicated at step 56, it will attempt to register on such channel, at step 58. If it does not find the channel acceptable under the applicable standards, it will revert back to selecting another channel from the randomized listing at step 52. In attempting to register, the terminal 24 sends a predetermined (registration) message on the inbound channel and the message is received by the NCP 12 and if signal strength is evaluated as acceptable, an acknowledgement is then transmitted and received back, at step 60. Upon receipt by the terminal, it is then free to operate on the selected channel, such as indicated at step 62. If no acknowledgement is received, the terminal reverts back to selecting another (next) channel from the randomized list at step 52. In addition, if the channel quality is determined as subgrade at any given time thereafter in the continuing and ongoing channel monitoring activity (to be described in connection with FIG. 6), the terminal 24 again reverts to the channel selection function at the step 52.

Channel Evaluation

Figure 5:
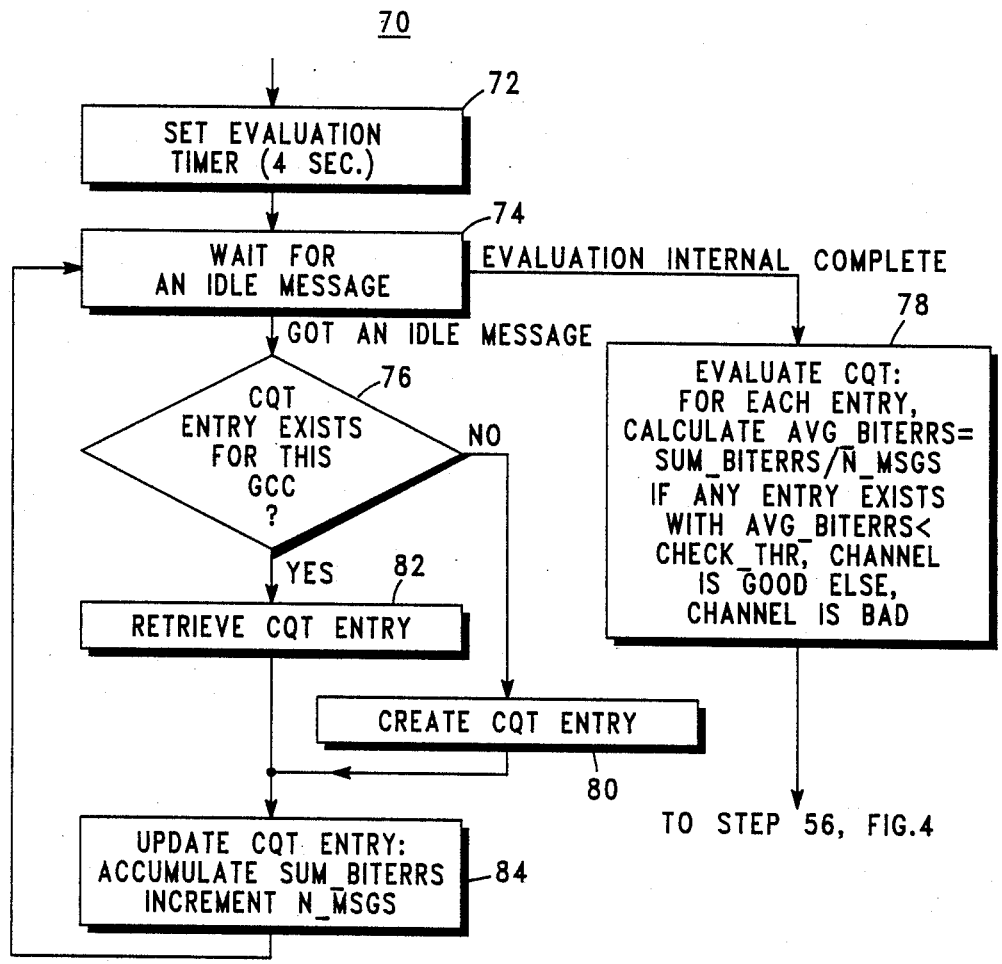
FIG. 5 is a flow diagram of the channel evaluation technique the system radio data terminals utilize to determine channel service quality at selected times.

The channel evaluation function indicated at step 56 in FIG. 4 is shown in more detail in FIG. 5. Upon initiation of the channel evaluation process, the terminal 24 sets an internally located timer (not specifically shown) at step 72 (which by way of example may be on the order of four seconds). The terminal 24 then waits for the next occurrence of an idle message at step 74 and either identifies one, then proceeding to step 76 or, if the previously set time expires, proceeding to step 78 where an associated Channel Quality Table (CQT), maintained internally within the terminal 24 (but not specifically shown here), is evaluated. As indicated, this table is used to itemize and keep the various entries in connection with the received idle messages. For each entry, the terminal 24 calculates the average bit errors, which are equal to the sum of all bit errors noted divided by the number of such messages. At step 78, if the average bit error rate from any station on the channel is less than the set threshold, the channel quality is deemed good. If not, it is deemed bad.

As indicated at step 76, if an idle message is received, the terminal determines if an entry exists for the identified GCC in its CQT. If not, it creates such entry at step 80. If yes, the terminal 24 retrieves the referenced CQT entry at step 82 and proceeds to update such CQT entry at step 84 by accumulating the sum of bit errors and incrementing the number of messages noted as having been received. Upon such update, the terminal 24 is then free to return to step 74 to wait for the opportunity to receive another idle message.

Channel Monitoring

Figure 6:
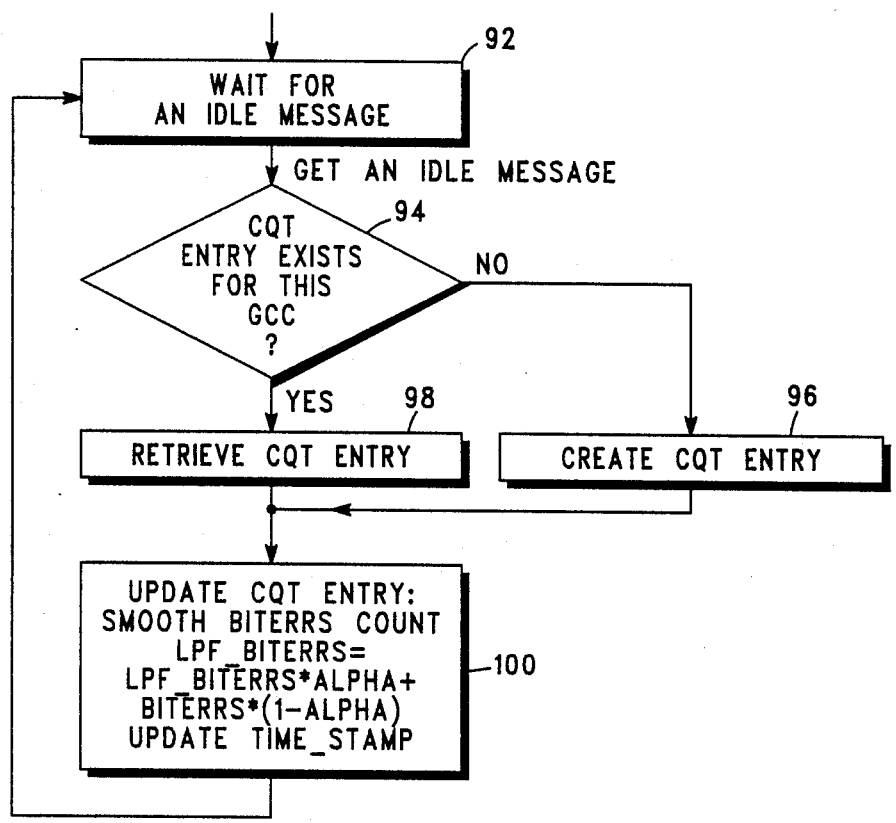
FIG. 6 is a flow diagram of the background monitor process employed by the system radio data terminals in order to update an internally located channel quality table (CQT)

The functional aspect of the channel monitoring process is presented as a two part procedure. FIG. 6 is illustrative of the activities for updating the CQT while FIG. 7 is directed to the evaluation of the CQT.

As will be noted, in reference to FIG. 6, the updating procedure follows somewhat the same steps as described in steps 74 through 80 of FIG. 5. The final step is somewhat different. The terminal 24 waits for an idle message at step 92 and if received, proceeds at step 94 to determine whether a CQT entry exists for the particular GCC involved If no, it creates an entry at step 96. If yes, it retrieves such entry at step 98. The final step 100 differs somewhat from the corresponding step 84 in FIG. 5 in that the bit error count is smoothed by a low pass filtering action which entails taking the previously filtered information in the entry table and adding to it the bit error information extracted from the present idle message being processed, multiplied by 1 - alpha; alpha being simply a smoothing constant. At the same time, the time stamp is also updated appropriately.

For evaluating the CQT as set forth in FIG. 7, the terminal 24 sets an associated, but internally located timer (not specifically shown) at step 112. This causes the terminal to periodically maintain and evaluate the CQT. The terminal 24 waits a predetermined time (as shown at step 74 in FIG. 5) after which it first proceeds to remove stale entries from the table at step 116. In the example shown, those with a time stamp older than thirty seconds are noted for removal. The terminal 24 is then free to evaluate the CQT by noting whether any existing entry has a filtered bit rate less than the monitor threshold. If yes, the channel is deemed good, and if not it is deemed poor, or below acceptable quality level. This then answers the question posed at step 120. If the channel quality is determined to be in the affirmative, the terminal 24 returns to step 112, ready to set the internal timer and repeat the process. If, however, the answer is in the negative, the terminal issues a "Channel Quality Poor" indication at step 122 and returns to step 52 in FIG. 4 to begin the selection process for yet another channel candidate.

In this manner, an improved technique for selecting an operating channel in an RF data communication system with multiple channels and disjoint coverage areas is provided whereby the remote portable/mobile data terminals may determine as well as maintain the best channel (frequency) for operating on at any given time without sacrificing nor creating any significant deleterious impact on system capacity.

Accordingly, what is claimed is:

1. In a multi-frequency radio data communication system operating on inbound and outbound channels with multiple transmitting sites interconnected to a central network control processor NCP and having multiple portable terminals, a method of channel selection for portable terminal usage which assures a set level of signal/service quality without unduly affecting outbound capacity, including the steps of:

a. having each portable terminal randomizing the list of frequencies available in the system;
b. each terminal upon initial operation selecting a channel from said random list, and if traffic is found, evaluating the quality level thereof and if acceptable attempting to register thereon by sending a channel registration message and receiving back an acknowledgement, if successful;
c. each portable terminal continuing to monitor the outbound channel and when signal/service quality falls below a threshold level, selecting a new channel from its random list and attempting to register thereon in the manner set forth in step (b); and
d. said portable terminals in response to a failure to successfully send an inbound message due to message errors, as well as receiving no acknowledgement response to a transmitter channel registration message, treating the same as an indication of poor signal/service quality and repeating step (c).

2. A method of channel selection in a multi-frequency radio data communications system in accordance with claim 1 wherein the step of evaluating channel quality includes setting an internal timer, waiting for an idle message to occur on the outbound channel and upon receipt thereof, determining whether a particular entry exists in an included Channel Quality Table and, if so, retrieving such entry and updating the same with current information.

3. A method of channel selection in a multi-frequency radio data communications system in accordance with claim 2 wherein if no prior entry has been logged in the terminal Channel Quality Table for the channel being monitored, then creating such an entry with information extracted from the received idle message.

4. A method of channel selection in a multi-frequency radio data communications system in accordance with claim 2 wherein the updating of the prior entry in the Channel Quality Table includes noting the sum of the counted bit errors in the received idle message and incrementing upwardly by one the number of received idle messages.

5. A method of channel selection in a multi-frequency radio data communications system in accordance with claim 2, then evaluating the information already within the Channel Quality Table such that, for each entry, calculation is made as to the average bit errors and on that basis determining whether such channel is deemed to have acceptable service quality or alternatively, of inferior service quality.

6. A method of channel selection in a multi-frequency radio data communications system in accordance with claim 5 wherein calculating the average bit errors includes taking the total of bit error count and dividing by the number of idle messages that have been received and wherein if any of the calculated bit error figure is less than a set check through level, the channel is deemed to have acceptable service quality.

7. A method of channel selection in a multi-frequency radio data communications system in accordance with claim 6 wherein if all of the calculated average bit error exceeds the set check thru level, the service quality is deemed inferior and the terminal returns to the step of selecting the next channel candidate on the randomized frequency list and repeats the channel evaluation process.

8. A method of channel selection in a multi-frequency radio data communications system in accordance with claim 1 wherein the step of registering on the selected channel includes the step of sending a registration message on the inbound channel and wherein such registration is deemed completed if an acknowledgement is received by the terminal in response to its transmitted registration message.

9. A method of channel selection in a multi-frequency radio data communications system in accordance with claim 2 wherein the evaluation phase of the channel monitoring effected by the remote terminal includes the step of periodically evaluating the Channel Quality Table by first removing any stale entries in the Channel Quality Table older than a selectable but set time period, and then noting whether any of the still remaining entries exist with a bit error rate less than the set monitor throughput level.

10. A method of channel selection in a multi-frequency radio data communications system in accordance with claim 9 wherein the channel is deemed to have acceptable service quality if any of this recorded bit error rates are less than the set monitor thru put level and then returning to the initial step in the evaluation process.

11. A method of channel selection in a multi-frequency radio data communications system in accordance with claim 9 wherein the channel is deemed to have unacceptable and inferior service quality if all of the recorded bit error rate exceeds the set monitor throughput level whereupon the terminal issues a poor channel quality indication and returns to the step of selecting a new channel.

12. A method of channel selection in a multi-frequency radio data communications system in accordance with claim 2 wherein the updating of the channel quality phase of the channel monitoring process by the remote terminals includes waiting for an idle message to occur on the outbound channel and upon receipt thereof noting whether a Channel Quality Table entry exists for the general communication controller originating the idle message whereupon the entry is retrieved and updated by smoothing the bit error count through low pass filtering and updating the time stamp associated therewith.

13. A remote radio data terminal for operating in a multi-frequency radio data communications system having multiple transmitting sites interconnected to a central NCP, which remote terminal may select an operating channel among multiple channels available while maintaining a set level of signal/service quality at all times, comprising in combination:
   means for randomizing a list of channels available on the system and maintaining the same within the terminal;
   means, upon turn-on of the remote terminal, for selecting a channel from said randomized list and evaluating the signal/service quality thereof;
   means, upon said evaluation being above a set threshold level, for sending a registration message on said selected and evaluated channel and, if an acknowledgement is received in response thereto, beginning normal operation thereon; and
   means for periodically and continually monitoring the channel so selected and registered upon, and initiating a new channel selection as upon turn-on whenever the signal/service quality falls below said set threshold level.

14. A remote radio data terminal for operating in a multi-frequency radio communications system in accordance with claim 13 wherein said means for evaluating channel quality includes means for setting an evaluation interval timer within which to wait for receipt of idle messages and, upon receipt thereof, updating an associated Channel Quality Table with information extracted from said received idle message.

15. A remote data terminal for operating in a multi-frequency radio data communications system in accordance with claim 14 wherein means are further included for evaluating the information already within the Channel Quality Table upon expiration of the evaluation internal timer.

16. A radio data terminal for operating in a multi-frequency radio data communications system in accordance with claim 14 wherein means are included such that if no acknowledgement is received by the terminal after transmitting said registration message, said means for selecting a channel from said randomized list is again activated.

17. A radio data terminal for operating in a multi-frequency radio data communications system in accordance with claim 14 wherein said means for periodically monitoring a selected channel includes means for evaluating the channel being monitored by removing any stale entries in said Channel Quality Table older than a set time period and then noting whether any remaining said table entries still remain with a bit error rate less than a set monitor throughput level.

18. A remote radio data terminal for operating in a multi-frequency radio data communications system in accordance with claim 17 wherein said means of updating the channel quality after evaluating as referenced in claim 17, includes means for waiting and receiving an idle message, noting whether a Channel Quality Table entry exists for the source of such message, and retrieving and updating such entry if it exists.

19. A remote radio data terminal for operating in a multi-frequency radio data communications system in accordance with claim 14 wherein the idle messages monitored by the remote terminals include information regarding the location and identity of the source transmitting any such message.

20. A remote radio data terminal for operating in a multi-frequency radio data communications system in accordance with claim 19 wherein such idle messages further include information regarding the location identity of the central controller if more than one such controller is present in the system.

* * * * *